US006977021B2

(12) United States Patent
Annacchino

(10) Patent No.: US 6,977,021 B2
(45) Date of Patent: Dec. 20, 2005

(54) SCREEN ASSEMBLY AND METHOD

(75) Inventor: Marc A. Annacchino, Greenfield, WI (US)

(73) Assignee: Alumaroll Specialty Co., Inc., Sheboygan, WI (US)

( * ) Notice: Subject to any disclaimer, the term of this patent is extended or adjusted under 35 U.S.C. 154(b) by 28 days.

(21) Appl. No.: 10/615,719

(22) Filed: Jul. 9, 2003

(65) Prior Publication Data

US 2005/0006037 A1 Jan. 13, 2005

(51) Int. Cl.[7] .............................................. B32B 31/00
(52) U.S. Cl. .................. 156/160; 156/293; 156/275.5; 160/371
(58) Field of Search ........................ 160/371; 156/160, 156/161, 293, 275.5, 275.7

(56) References Cited

U.S. PATENT DOCUMENTS

| | | | |
|---|---|---|---|
| 1,058,616 | A | 4/1913 | Maze |
| 2,791,264 | A | 5/1957 | Couse |
| 3,255,810 | A | 6/1966 | Rowbottam |
| 3,296,056 | A | 1/1967 | Bechtold |
| 3,341,013 | A | 9/1967 | Moulton |
| 3,373,546 | A | 3/1968 | Setnan |
| 3,455,367 | A | 7/1969 | LeTarte |
| 3,542,619 | A | 11/1970 | McManus |
| 3,756,881 | A | 9/1973 | Denman |
| 3,760,860 | A | 9/1973 | Kelarakis |
| 3,871,153 | A | 3/1975 | Birum, Jr. |
| 4,161,977 | A | 7/1979 | Baslow |
| 4,183,986 | A | 1/1980 | Blaetterlein |
| 4,189,880 | A | 2/1980 | Ballin |
| 4,197,686 | A | 4/1980 | Baslow |
| 4,248,657 | A | 2/1981 | Henry |
| 4,568,455 | A | 2/1986 | Huber et al. |
| 4,635,418 | A | 1/1987 | Hobgood |
| 4,663,231 | A | 5/1987 | Girgis et al. |
| 4,675,065 | A | 6/1987 | Gordon |
| 4,684,425 | A | 8/1987 | Bannister |
| 4,741,797 | A | 5/1988 | Henderson et al. |
| 4,851,070 | A | 7/1989 | Shimada |
| 4,949,518 | A | 8/1990 | Nagel et al. |
| 4,968,366 | A | 11/1990 | Hukki et al. |
| 4,981,075 | A | 1/1991 | Christman |
| 5,032,210 | A | 7/1991 | Hukki et al. |
| 5,039,246 | A | 8/1991 | Woodruff et al. |
| 5,090,469 | A | 2/1992 | Boulanger |
| 5,137,622 | A | 8/1992 | Souter |
| 5,238,515 | A | 8/1993 | Insalaco et al. |
| 5,258,083 | A | 11/1993 | Monk et al. |
| 5,407,522 | A | 4/1995 | Insalaco et al. |
| 5,615,776 | A | 4/1997 | Bjorklund et al. |

(Continued)

*Primary Examiner*—Blair M. Johnson
(74) *Attorney, Agent, or Firm*—Foley & Lardner LLP

(57) ABSTRACT

A screen assembly apparatus and method for making the same are disclosed. The screen assembly apparatus comprises a plurality of adjustable guides for positioning a screen frame in a pre-assembly position along a base, a vacuum device for removably securing the screen frame to the base located within the screen assembly apparatus in alignment with dispensing heads, and a screen advance for moving the screen along the base in order to attach the screen to the screen frame. The dispensing heads are configured to engage the screen frame as it moves from the pre-assembly position to a post-assembly position and perform multiple functions thereon. The functions include positioning the screen within a slot extending at least substantially along a front side of the screen frame, applying an ultraviolet curable adhesive into the slot, curing the ultraviolet curable adhesive with ultraviolet light, and trimming excess screen material along the front side of the screen frame.

14 Claims, 11 Drawing Sheets

U.S. PATENT DOCUMENTS

| | | | | |
|---|---|---|---|---|
| 5,662,383 | A | | 9/1997 | Hand |
| 5,666,773 | A | | 9/1997 | Librande et al. |
| 5,676,052 | A | | 10/1997 | Wegrzyn et al. |
| 5,689,924 | A | | 11/1997 | Mason |
| 5,715,638 | A | | 2/1998 | Anderson, Sr. |
| 5,718,791 | A | | 2/1998 | Spengler |
| 5,775,400 | A | | 7/1998 | Wilkinson |
| 5,783,137 | A | | 7/1998 | Alives Porta |
| 5,787,657 | A | | 8/1998 | Librande et al. |
| 5,794,328 | A | | 8/1998 | Simone |
| 5,794,528 | A | | 8/1998 | Gronig et al. |
| 5,797,223 | A | | 8/1998 | Shoup et al. |
| 5,806,549 | A | | 9/1998 | Love |
| 5,816,279 | A | | 10/1998 | Zheng |
| 5,816,954 | A | | 10/1998 | Zheng |
| 5,819,651 | A | | 10/1998 | Zepic et al. |
| 6,032,454 | A | | 3/2000 | Damour et al. |
| 6,156,089 | A | * | 12/2000 | Stemmer et al. .............. 55/467 |
| 6,279,644 | B1 | | 8/2001 | Wylie |
| 6,331,223 | B1 | * | 12/2001 | Wylie et al. ................ 156/160 |

* cited by examiner 130
214
216
218
220
222
224
226
228
230
232
234
236
159

SCREEN ASSEMBLY AND METHOD

BACKGROUND OF THE INVENTION

The present invention relates generally to the field of screen and frame assemblies for windows, doors and the like, and in particular, to screen and frame assemblies in which the screen is secured to the frame by a curing process, and methods of manufacturing such products.

Over the years, many different types of screens have been used to prevent the ingress of insects and other pests into indoor areas, while still providing ventilation. Typical screen assemblies comprise screen cloth, fabric, or mesh attached to a screen frame in a manner that will be discussed in greater detail below. As used herein, the term "screen" includes screen cloth, fabric, mesh, or similar ventilation material.

Screen frames for windows, doors, and the like are commonly made of four elongated frame members, often referred to as screen bars (or screen bar members), of uniform cross section. These bars are typically roll-formed from aluminum or sheet steel, although some may be extruded aluminum. Plastic and wood are also used, but to a lesser extent. These screen bars are supplied from the screen bar manufacturer in lineal form and are cut to a final length by the screen assembly manufacturer. Further, these screen bars are held together at the corners with plastic or metal inserts, called corner keys, to form the screen frame.

Different style corner keys are available and are designed to match the particular screen bar used. The most popular corner key allows the screen bar to be cut straight at 90 degrees at the ends. These keys typically are made from injection molded plastic and have a square block body to visibly fill the corner area of the frame. Attached to the body are insertion prongs that are pushed into the hollow screen bar profile to create friction fit connections. Corner keys requiring a 45 degree miter cut on the ends of the screen bar also can be used. These keys, usually metal, are less expensive and are entirely hidden inside the screen bar. These keys also provide a friction fit connection.

Screen material is typically affixed to the screen frame, in a manner discussed below, to form a screen and frame assembly. These assemblies may then be removably secured to windows, doors (e.g., patio screen doors), operable skylights, and the like. Screen and frame assemblies for such openings are very similar, often differing only in size. Accordingly, for brevity, screen and frame assemblies for windows are described herein. Nevertheless, it will be understood that this discussion applies equally to screen and frame assemblies for doors, operable skylights and virtually any opening provided in a building.

It is generally desirable that the screen be a light weight fabric or mesh, and stretched taut across the screen frame to avoid unsightly sag and to allow a viewer to see through the screen with minimal visual interference. However, if the screen is tensioned excessively, the screen bars deform inwardly in an hourglass shape. This resultant shape is not only aesthetically undesirable, but also can prevent proper installation in the window opening. Excess screen tension also increases the risk of tearing the screen during manufacture of the screen and frame assembly or while the assembly is in service. Typically, the screen is fiberglass yarn or roving, which is coated, for example, with polyvinyl chloride (PVC), woven and heat fused. Another popular form of screen is made by weaving drawn aluminum wire, which is subsequently painted.

Within the industry, it is typically a practice to secure screen material in open grooves formed along inside edges of the screen frames using a stuffer strip known as "spline" and its associated fastening techniques. The open grooves are known as "spline grooves." A spline is often a wire-like, extruded rigid plastic or foam material, although some splines are made from metal, especially for use with aluminum screens. A spline is usually round or T-shaped in cross section, but can be U-shaped, for example.

A standard procedure for manufacturing and hand wiring a screen and frame assembly is discussed in more detail below. First, the screen bars are cut to length, accounting for the corner key dimensions. Then, the screen frame is assembled using the cut screen bars and corner keys. When light construction screen bars are used, as is often the case, a balance between pre-bow tension and screen tension is necessary to ensure straight screen bars and desirable screen tension in the final assembly. When the screen bar has insufficient pre-bow tension, the bars are deformed by hand a sufficient degree after the corner keys have been inserted. The amount of pre-bow is usually determined based on experience, but is typically a few millimeters of bow per meter length of the screen bar.

The screen frame is then secured to a table using locator (stop) blocks, which prevent shifting and maintain the frame square during screen installation. The table typically has permanent stop blocks for orienting the screen frame. To avoid hourglassing, removable blocks are located on the inside of the frame segment to limit deflection of the screen bar by the screen tension on assembly. More elaborate tables use removable blocks arranged in grooves cut into the table, with the removable blocks being secured by integral friction clamps.

After the screen frame is secured to the table, the screen is pulled from a roll and positioned to cover the opening formed by the frame. Ideally, no excess screen is used, but this is sometimes difficult to achieve in practice. As a result, most manufacturers cut the screen some predetermined length wider than the frame width, so that the screen is pulled past the end of the frame to ensure that sufficient amount of screen can be rolled into the spline groove along the frame perimeter. In either technique, the screen is positioned over, with edges parallel to, the secured screen frame.

The screen and spline are installed into the spline groove by starting in one of the frame corners. The screen is then stretched taut at the next corner with one hand, keeping it straight and parallel to the edge of the mating screen bar. The spline is simultaneously held above the groove in the same manner as the screen, with the same hand. With the other hand, the installation roller is pushed along towards the upcoming corner with a firm downward force to push the spline into and trap the screen in the spline groove. This action is repeated on the second and third screen bars. On the last screen bar, most of the tension is set into the screen. On this leg, the screen is pushed into the screen bar with the installer's finger, just prior to the insertion of the spline. This pre-insertion technique reduces the final tension in the screen to the desired level. The spline is cut at the final corner with a utility knife.

After the spline and screen are inserted in all screen bars, excess screen around the edge of the frame is cut away with a utility knife. To do this, the point of the blade is pushed against the screen bar, through the screen, immediately adjacent to the spline groove around the outside edge of the screen bar. Care must be taken to cut the screen close to the spline groove without cutting the screen covering the opening formed by the frame. The finished screen and frame assembly is removed from the table, inspected, and any necessary hardware is attached.

The current hand wiring process using conventional splines has several drawbacks. For example, most screens and frame assemblies must meet industry standards. These standards cover particular elements of screen and frame assemblies for windows, patio doors and the like. For example, some standards set forth tolerances in terms of the strength of the screen, the strength required to fasten the screen to the screen bar, the amount of sag in the screen, etc. Although these standards generally can be met by using the spline technology discussed above, very close and consistent dimensional tolerances are required between the spline and the spline groove, respectively, in order to achieve the specified fastening strength. These tolerances require close attention and skill with current screen bar roll-forming and extrusion technology and current spline hand wiring techniques. Any out-of-tolerance spline and screen bar produced costs the manufacturer in wasted time, material and goodwill.

Further, the amount of force required by an installer to secure the screen with the spline in the spline groove may be high enough to cause repetitive strain injury (e.g., carpal tunnel syndrome) to one who routinely performs this job. This is of major importance, since this type of injury is serious and has received heightened public awareness. Further, such an injury to an installer is also costly to the manufacturer in terms of compensation and loss of skilled labor.

Also, the hand wiring technique is particularly difficult and time-consuming. Notably, it is difficult to control the wire-like spline material and simultaneously control the screen tension with one hand, while the spline is rolled in with the other hand. This operation requires a high degree of skill and careful attention. This adds to the final manufacturing cost, and, hence, increases the final cost to the consumer. Final product consistency is difficult to maintain.

In addition, quality control is also an issue with current spline techniques. Specifically, installers have learned ways to make their jobs easier, to the detriment of quality control. This is particularly true when using PVC spline. For example, an installer will stretch the PVC spline just prior to insertion, in order to reduce the diameter of the spline. This, of course, makes it easier to install. However, this also reduces the "pull-out" force or attachment strength of the spline and screen. The result is that the screen can be more easily pulled out from the spline groove, which is undesirable.

There are other drawbacks associated with conventional spline techniques. In particular, the use of a separate fastening device, such as a spline, requires separate inventory control and associated costs. Screen manufacturers prefer to minimize inventory. Therefore, it is desirable to eliminate the spline as a separate item. Also, the need to have a strong interference fit in securing the spline necessitates stiff walls on the spline groove. Further, the spline technology makes the design of automatic assembly equipment extremely complex.

Accordingly, there have been some attempts in the art to provide screen and frame assemblies without a traditional spline. Such systems generally require some type of thermoplastic resin or hot melt adhesive. As is often the case, such systems are overly complex and require high manufacturing precision. Further, these techniques can be slow and cumbersome and therefore impractical in the manufacture of screen and frame assemblies for windows and the like. For example, these known systems typically require external tensioning until the thermoplastic resin or hot melt cools and solidifies.

In recent years, numerous modifications to the traditional hot melt adhesive techniques have been developed. For instance, techniques such as light energy methods are now being used to solidify compounds instead of the previously used heat curing system. These new light energy methods, such as the ones used in the current disclosure, are both chemically and practically different than hot melt methods.

Hot melt adhesives can be either curable or non-curable. Non-curable hot melt adhesives are usually formed from derivatives of polyester, polyamide, polyolefin, polypropylene, polyurethane, butyl and ethylene vinyl acetate functional groups. Each of these chemical groups has distinct physical properties thereby making some better hot melt adhesive candidates than others. For example, polyester and polyamide adhesives are oftentimes preferred over others. In general, the hot melt technique uses heat to adhere objects together. Once the resin is heated and applied, the system must be cooled for complete adhesion to occur. The adhesive is normally liquid upon application and later sets to form a solid bond. The regular hot melt adhesive (non-curable) can be applied, dried, and then later re-melted during the adhesion process.

In general, curable hot melt adhesives are similar to non-curable adhesives. One difference, however, is that adhesion must occur immediately after application for curable hot melt adhesives. Because attachment must occur directly after application of the hot melt, this technique is usually not used. Hot melt adhesives are often more practical. As with non-curable adhesives, heat is used to set the compound and establish the bond.

One approach that may be used instead of the hot melt process is ultraviolet curing. For this method, ultraviolet light, instead of heat, may be applied to acrylate and methacrylate containing resins in order to attach the elements. The resins may contain a special additive known as a photo-initiator that responds to the ultraviolet light and crosslinks the polymer resin. These functional groups are chemically different than the above mentioned compounds. The pure acrylates do not contain nitrogen and therefore cannot be defined as either polyamides or polyurethanes, further differentiating them from the hot melt technology. Accordingly, the final resins of ultraviolet curing are chemically different from the final resins of hot melt curing because of additions like those described above that are made to the resins.

As an example, Loxeal srI (MI) Italy produces an ultraviolet curable compound under the trade name Loxeal Anerobic 3025 that includes a photo-initiating element to facilitate the bonding reaction. When light of the correct wavelength is applied to the resin, it causes some of the carbon-carbon double bonds to break into radicals (chemical species with and odd number of electrons), which then react with acrylate or methacryate compounds in a free-radical reaction to cure the resin. In addition, there is a coordination that can be made between the emitted wavelength of light and the compound formulation to create different characteristics of curing.

It is also possible to have the compounds break into ions instead of radicals when the light is applied. This is called the cationic reaction type. In this type of situation, the bonds break so that a full electron pair is transferred from one half of the molecule to another so that there is an even number of electrons and either a net positive or negative charge. In contrast, hot melts do not add photo-initiators and do not use light. Instead, hot melts use heat to complete the adhesion process. Further, hot melt manufacturers often add sufficient amounts of carbon black to the adhesive in attempt to block out any ultraviolet rays. In addition, light absorbing and stabilizing compounds are sometimes added to prevent a reaction between the adhesive and ultraviolet light. Thus, ultraviolet curable compounds have not been used heretofore to attach screens to screen frame assemblies.

Accordingly, there exists a need for a screen and frame assembly that eliminates the requirement of a separate, mechanical spline. In addition, there exists a need to manufacture screen products more easily, where a screen may be secured to a frame quickly, with reduced manual labor. Further, there exists a need for a screen and frame assembly that substantially reduces the level of skill and time, as well as physical force, required to attach screen to a screen bar and/or frame.

SUMMARY OF THE INVENTION

One embodiment of the invention relates to a screen assembly comprising a screen formed of open mesh ventilation material, a plurality of bar members secured together to form a screen frame, each of the plurality of bar members including a tapered slot extending at least substantially along a front side of the bar member, the front sides of the members defining a plane containing a portion of the screen lying between the plurality of bar members, an opening of the tapered slot being in the plane of the front side, a base of the tapered slot being substantially parallel and offset from the front side, and sides of the tapered slot being generally tapered inward from the base to the opening of the slot. In addition, the screen is spread across the front side of the screen frame and tensioned by the tapered slot along the front side of the respective bar member, encapsulated by a curable compound applied within the tapered slot of each of the plurality of bar members, and bonded by the compound to the tapered slot of the respective bar member.

Another embodiment of the invention relates to a screen assembly comprising a screen formed of open weave material and a screen bar frame having a mounting area thereon. In addition, the screen is spread across the screen bar frame and tensioned by the mounting area, encapsulated by an ultraviolet curable adhesive along the mounting area, and bonded by the ultraviolet curable adhesive to the mounting area.

Another embodiment of the present invention relates to a method for manufacturing a screen assembly. The method comprises constructing a screen bar frame having a tapered slot extending at least substantially along a front side of the screen bar frame, spreading a screen formed of open mesh ventilation material over the screen bar frame so that a portion of the screen is disposed within the tapered slot, applying a predetermined quantity of curable compound onto the portion of the screen disposed within the tapered slot, and curing the curable compound to mechanically interlock the screen to the screen frame at a predetermined tension.

Another embodiment of the present invention relates to a method for manufacturing a screen assembly. The method comprises constructing a screen bar frame having a mounting area thereon, spreading a screen formed of open mesh ventilation material on the mounting area, applying a predetermined quantity of an ultraviolet curable adhesive onto the mounting area, and curing the adhesive to mechanically interlock the screen to the mounting area Another embodiment of the present invention relates to a screen assembly apparatus for securing a screen to a screen frame. The apparatus comprises a plurality of adjustable guides for positioning a screen frame in a pre-assembly position along a base, a vacuum device for removably securing the screen frame to the base located within the screen assembly apparatus in alignment with dispensing heads, and a screen advance for moving the screen along the base in order to attach the screen to the screen frame. The dispensing heads are configured to engage the screen frame as it moves from the pre-assembly position to a post-assembly position and perform multiple functions thereon including position the screen within a slot extending at least substantially along a front side of the screen frame, apply an ultraviolet curable adhesive into the slot, cure the ultraviolet curable adhesive with ultraviolet light, and trim excess screen material along the front side of the screen frame.

Another embodiment of the present invention relates to a screen assembly apparatus for securing a screen to a screen frame. The assembly comprises a plurality of adjustable guides for positioning a screen frame in a pre-assembly position along a base, a screen advance for moving the screen along the base in order to attach the screen to the screen frame, and dispensing heads for engaging the screen frame and performing multiple functions thereon as the screen frame moves from a pre-assembly position to the post-assembly position. The multiple functions include positioning the screen within a slot extending at least substantially along a front side of the screen frame and securing the screen within the slot by way of an ultraviolet curable adhesive.

DETAILED DESCRIPTION OF THE PREFERRED EMBODIMENTS

Figure 1:
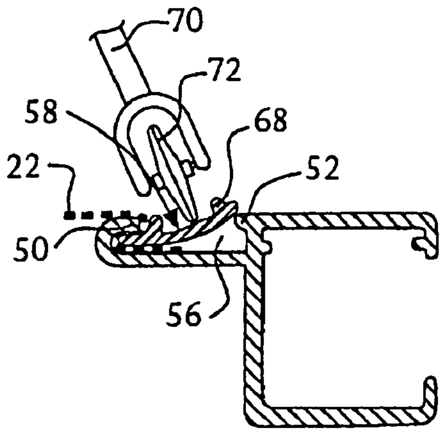
FIG. 1 PRIOR ART
FIG. 1 shows a cross-sectional view of a conventional method of installing screen into a screen frame using spline and a hand roller.
Figure 2:
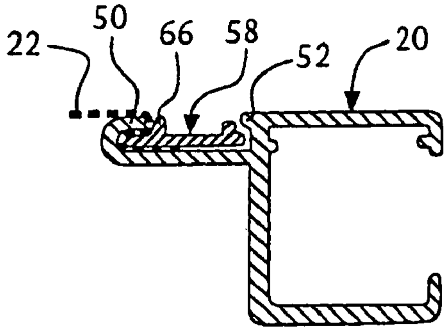
FIG. 2 PRIOR ART
FIG. 2 shows a cross-sectional view of screen installed into a screen frame using spline, as is conventional in the art.

A known method of attaching a screen to a screen frame is shown in FIGS. 1 and 2. According to the provided example, spline 58 is forced into spline groove or recess 56 in the screen bar 20, with the screen 22 sandwiched between the spline 58 and the spline groove 56. The screen 22 is held by friction between the spline 58 and the spline groove 56 with the resulting interference fit. A lip 50 and a ledge 52, part way down one side of the groove wall, are typically included to help trap and improve the strength in retaining the screen 22. The spline 58 and trapped screen 22 are forced into the groove 56, usually by hand, with the use of a roller device 70, including a roller 72, as shown in FIG. 1. The term, "hand wiring", is used to describe the action of securing the screen 22 with spline 58 into the spline groove 56. Many attempts have been made to automate the installation of spline by machine. Unlike the disclosed inventions, this automation has proven to be very difficult and machines of this nature have not been widely accepted as a viable option to hand wiring.

Figure 3:
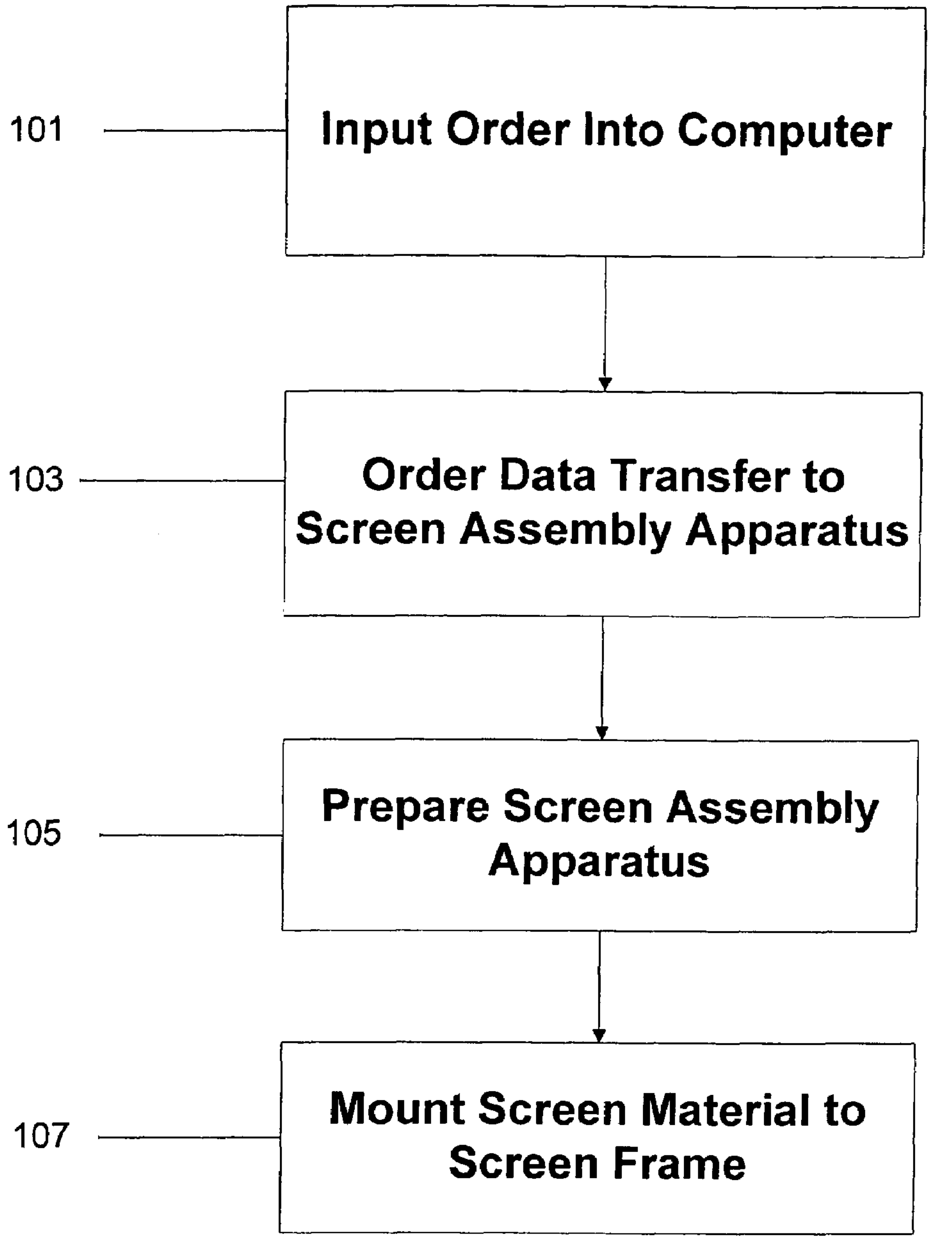
FIG. 3 shows a block diagram for a process used in securing a screen to a screen frame according to an exemplary embodiment.

FIG. 3 shows a block diagram for the process used in securing a screen to a screen frame according to a preferred embodiment of the invention. The process generally begins with the step of inputting an order 101 into a main computer where the order includes information such as the dimensions of the particular screen frame to be created. Next, the order data is transferred 103 to a controller of a screen assembly apparatus. The controller will use this transferred order data to prepare 105 the screen assembly apparatus to construct a screen assembly according to the order data input in the first step. For example, a supply of screen material will be positioned on the screen assembly apparatus and a screen frame will be positioned in the screen assembly apparatus and prepared to receive the screen material. Next, the screen assembly apparatus will mount the screen material to the screen frame 107 through the use of a variety of components such as an ultraviolet compound dispensing head, an ultraviolet light source and a knife or blade for trimming excess screen material. Finally, the assembled screen frame will be transferred from the screen assembly apparatus for shipping and processing and the screen assembly apparatus will be prepared for a repetition of the process described above.

Figure 4:
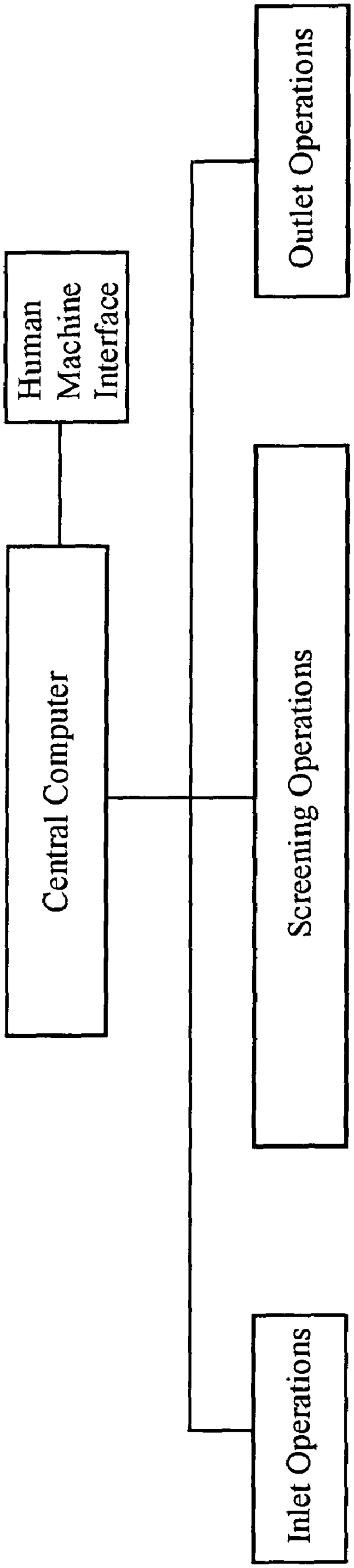
FIG. 4 shows a control architecture of a screen assembly apparatus according to an exemplary embodiment.

At step 101, an order is inputted into a main computer. The order is made by a user overseeing the screening process. The order may include information such as the dimensions of the particular screen frame to be created. Next, the order data is transferred at step 103 from a main computer to a controller of a screen assembly apparatus. Further, the computer sends data based on the order to other parts of the screen assembly apparatus for readjustment depending on particular requirements. Thus, each of the subsystems of the apparatus, including but not limited to those described in this disclosure, may be under the control of the main computer. For example, the main computer could control an inlet section, a screening mechanism, an outlet section, etc. Each section could accept central command orders and operate independently. The control architecture of the machine is based on two different protocols. The first protocol is a high speed communication link that controls the axis movement of the apparatus as well as the ancillary input, outputs, and sequencing of the apparatus. The second protocol is hierarchical communication link used for downloading order and readjustment information and uploading diagnostic information to the main computer. As shown in FIG. 4, the computer controls inlet operations, screening operations, and outlet operations.

Figure 5:
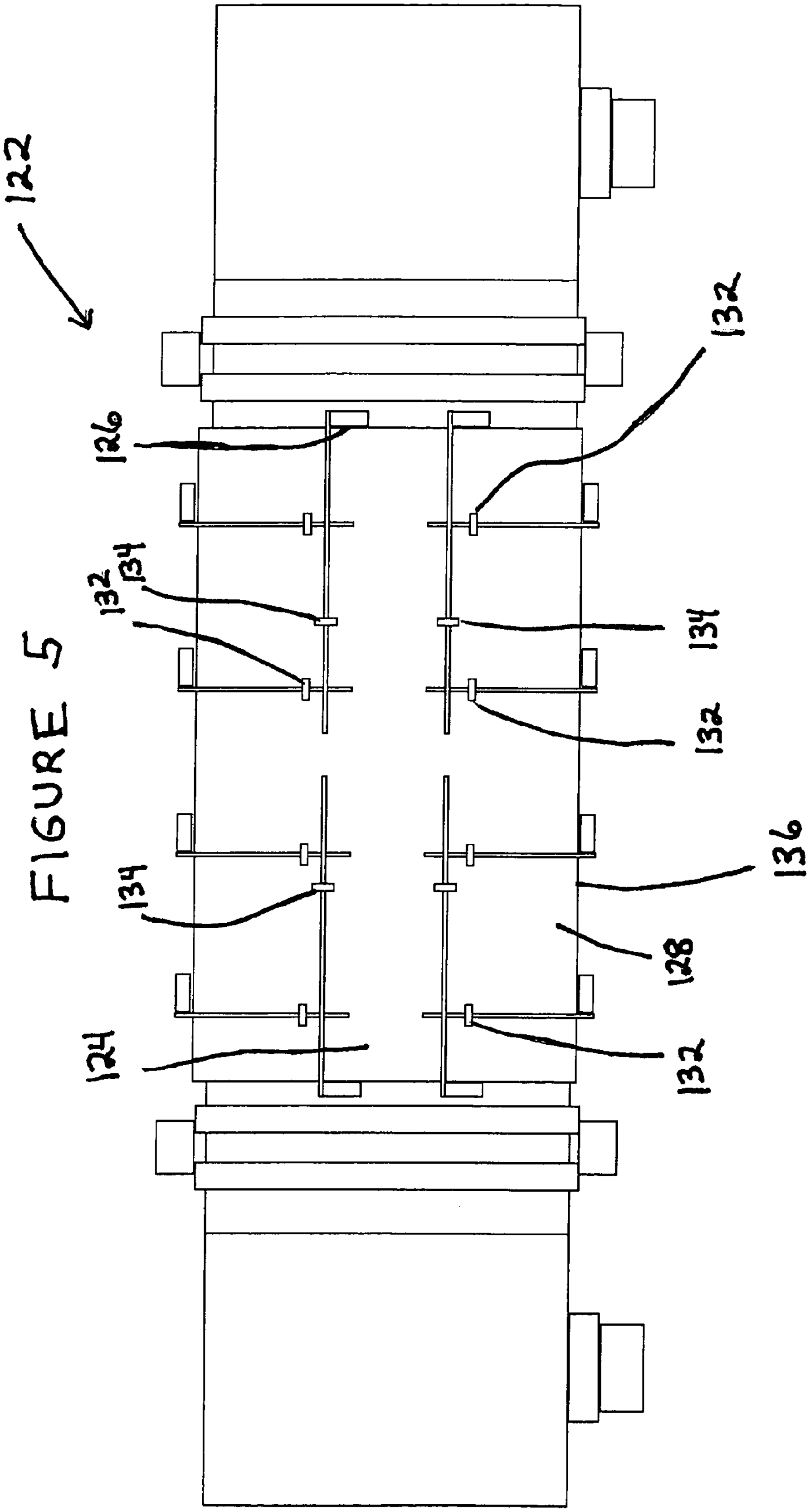
FIG. 5 shows a screen assembly apparatus according to an exemplary embodiment.

FIG. 5 shows the preferred structure used to carry out step 105 in greater detail. FIG. 5 shows a screen apparatus 122 which includes an inlet section 124, an end stop 126, and vacuum system 128. To adjust a screen frame, a manual or automatic feed operation may be used to guide the screen frame into an inlet section 124 of screen apparatus 122. In a manual system, an operator loads a screen frame into screen apparatus 122 at inlet section 124. The screen may be adjusted by the operator and stopped with a programmable end stop. In an automatic system, these operations are performed automatically under the control of a computer system. In a preferred embodiment, screen apparatus 122 is capable of receiving (e.g., being fed) screens from about 18×12 inches up to and including about 48×96 inches. The machine is adapted to readjust its parameters based on the particular dimensions of an order.

Figure 6:
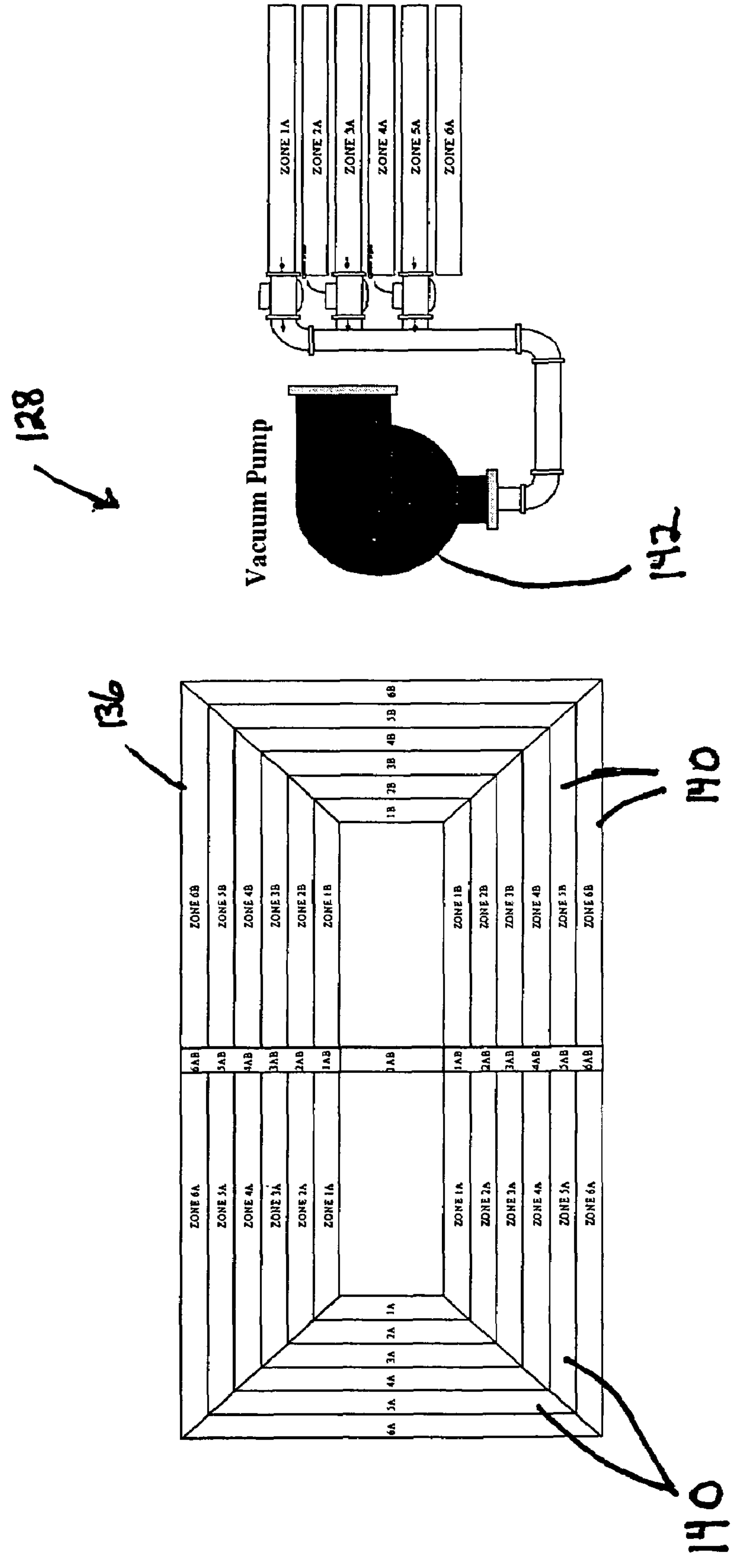
FIG. 6 shows a vacuum system for securing a screen frame to a screen assembly apparatus according to an exemplary embodiment.

Referring to FIG. 6, when loading a screen frame into position within apparatus 122, a general vacuum/pressure zone 140 (e.g., position) for securing the screen frame may be identified via a look-up table developed by correlating screen size to the most relevant vacuum zone 140. This procedure may be done either manually or automatically by a computer system. Based on the zone that is determined, the screen frame may then be loaded into the prescribed position. Locating tangs 132 and stops 134 shown in FIG. 5 are used to hold the screen frame in position. The locating stops 134 and tangs 132 may be readjusted depending on a particular size for a given screen. In general, the size of the screen will dictate the position of locating tangs 132. According to an exemplary embodiment, the locating tangs may be adjusted by electromechanical means so as to locate the screen frame and also pre-stress it to prevent hourglassing of the frame. According to a preferred embodiment, the overall feeding process occurs within a few seconds, and more preferably, within about one second regardless of screen size.

According to alternative embodiments, the inlet section may include additional adjustable guides. For example, the inlet section may include belts and/or rollers for locating and affixing the frame for any secondary screening operations. These guides may be made from materials that will be hard enough for good wear characteristics and pliable enough for effective location of the frame. The guides may be adjusted so that the screen can be located in a rapid and accurate manner (e.g., by using a screw and nut fastening arrangement). A programmable end stop may be used to stop the screen in the line feed axis. As described above, operation of the inlet section on the screen assembly apparatus may be controlled by a computer system comprising operational software. The computer system can handle safety interlocks, the machine sequences and diagnostic procedures. The inlet section can also be equipped with sensors for feeding basic status information to the computer system.

In step 105, a vacuum system 128 is used to removably secure a screen frame to a platen 136 (e.g., stationary portion of the screen frame apparatus). Vacuum system 128 and platen 136 are shown in greater detail in FIG. 6. According to a preferred embodiment, vacuum system 128 keeps the screen frame in alignment with a plurality of compound dispensing heads that are configured to dispense compound into the frame and orient in x, y and z coordinates.

According to a preferred embodiment shown in FIG. 6, vacuum system 128 consists of zones 140 on platen 136 that are under solenoid control. Vacuum system 128 further comprises a vacuum pump 142 adapted to control the pressure applied at specific zones 140. For example, FIG. 6 shows vacuum pump 142 coupled to various zones 140. In order to create vacuum system 128, the screen assembly apparatus can utilize relatively simple contactors and fan/vacuum systems in combination with solenoids. By controlling only certain solenoids, an efficient vacuum system can be created that will operate on selective frame components rather than the entire platen 136. Vacuum system 128 is adapted to reverse the direction of the air flow from the application of negative air pressure (e.g., vacuum) used during the vacuum clamping operation of the screen frame to the application of a positive air pressure operation which can be used to facilitate the ejection of the completed screen. For example, three way valving may be used for the air line feeding the specific zones. In addition, the pressure cycle may act as a purge for the small holes in the platen to prevent dirt and extraneous material from becoming lodged therein.

Figure 7:
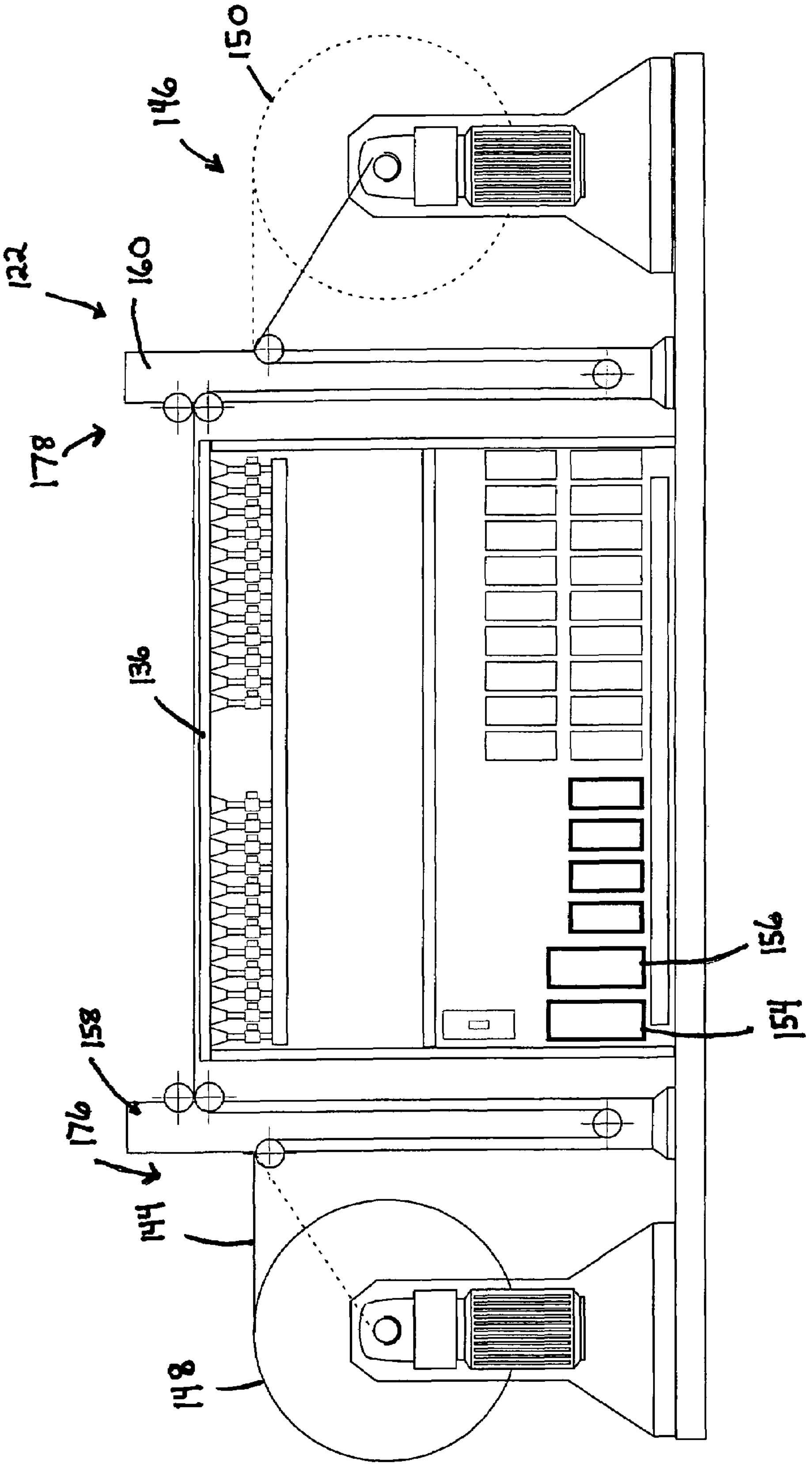
FIG. 7 shows a screen assembly apparatus according to an exemplary embodiment.

In step 105, screen material 144 is advanced along screen assembly apparatus 122 for attachment to a screen frame. As shown in FIG. 7, a screen advance system 146 (e.g., material feed-to-stop system) provides an independent feed-to-stop system that advances screen material 144 from payoff roll or unwind reel 148 to take-up roll/reel 150 across platen 136 where the screen frame is screened. Feed-to-stop system 146 is preferably controlled by two drives 154, 156 powering two motors 158, 160 through right angle gearboxes. High speed linear motors 158, 160 power a material indexer that positions screen material 144 above platen 136. Unwind and take-up reels 148, 150 and drive/motor combinations 154, 156, 158, 160 are used to create the appropriate tension for screen material 144. In general, the actual required torque may be determined empirically through machine use. According to a preferred embodiment, unwind reel 148 and take-up roll/reel 150 are of constant speed. Linear motors 148 and 150 perform high speed positioning by gathering screen material 144. For example, as linear motors 148, 150 move downward, they gather screen material 144 at the material indexer. Linear motors 148, 150 then retract upwards to position screen material 144 across platen 136.

Material feed-to-stop system 146 is preferably an integrated part of screen apparatus 122. Apparatus 122 can handle a screen roll of about 55 inches wide. Since different size screens may be used with this set-up, screen advance system 146 may feed screen material 144 on a first side 176 and then index on a second side 178 on rewind. The illustrated machine is preferably bidirectional so that take-up reel 150 becomes an unwind or feed reel in order to allow use of a wider roll. This also eliminates waste and maximizes usage of screen material. The rewind operation is preferably completely symmetrical with respect to the unwind operation.

According to a preferred embodiment, the material is fed off of payoff reel 148 at a rate of about 1 foot per second. However, the rate of the unwind and rewind may be adjusted based on the size of the screen to be made. The length of the material across platen 136 may be up to about 8 feet and the width of the material across platen 136 may be up to about 6 feet.

Figure 8:
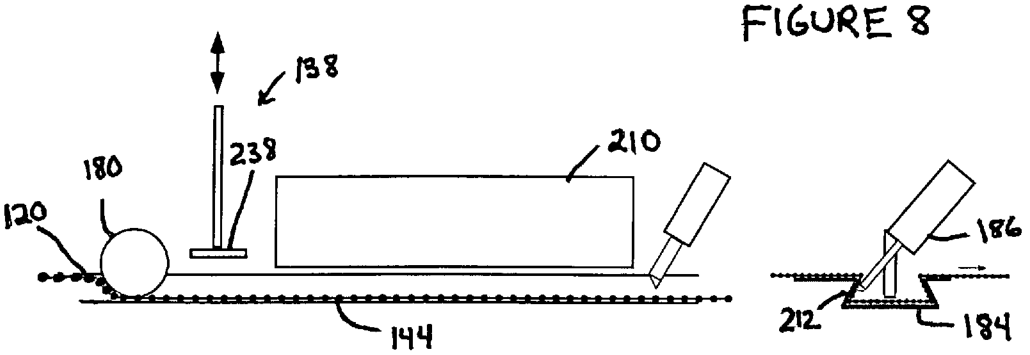
FIGS. 8–10 show a process for mounting screen material to a screen frame according to an exemplary embodiment.
Figure 9:
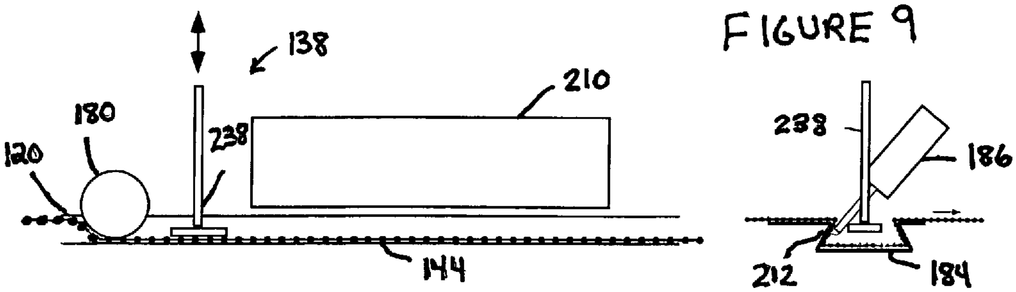
Figure 10:
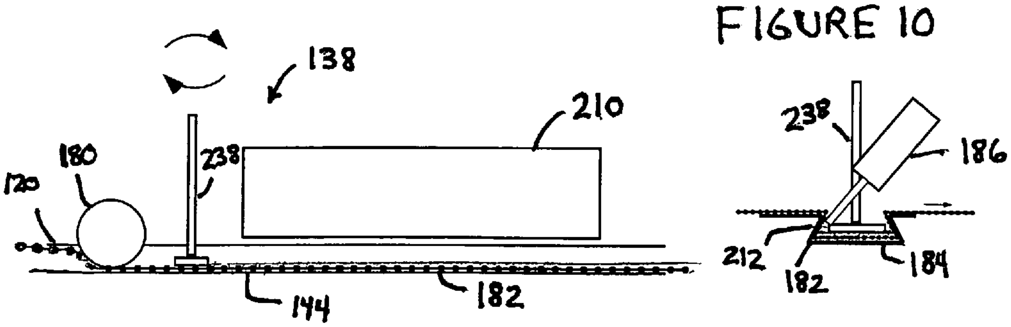

After the web of screen material is properly positioned above the screen frame, the next step in the process is to secure screen material 144 to the frame. The process of mounting the screen material 144 to the screen frame utilizes dispensing heads 138 and requires multiple steps. FIGS. 8–10 show the sequence of steps in greater detail. The steps include seating screen material 144 into a screen frame 120 with seating wheel 180 and dispensing heads 238, dispensing curable compound 182 into slot 184, curing compound 182 with ultraviolet light to create a bond for retention of screen material 144 in slot 184, and trimming excess screen material with a trimming device 186 (e.g., ultrasonic knife).

FIGS. 11–14 show the process of seating screen material 144 within slot 184 in greater detail. As described above, screen material 144 is positioned over screen frame 120 by the reels. As screen material 144 is advanced between the reels, a plurality of seating tools 238 (e.g., sub-heads) located on the mounting devices are positioned with respect to screen frame 120 and slot 184. Heads 238 are positioned by linear motors to a desired location for proper insertion into slot 184 located on screen frame 120. The use of linear motors can minimize appreciable wear on items and increase accuracy and repeatability. Another advantage of linear motors is that they are very fast and have very dynamic response with no appreciable mechanical resonance.

Figure 15:
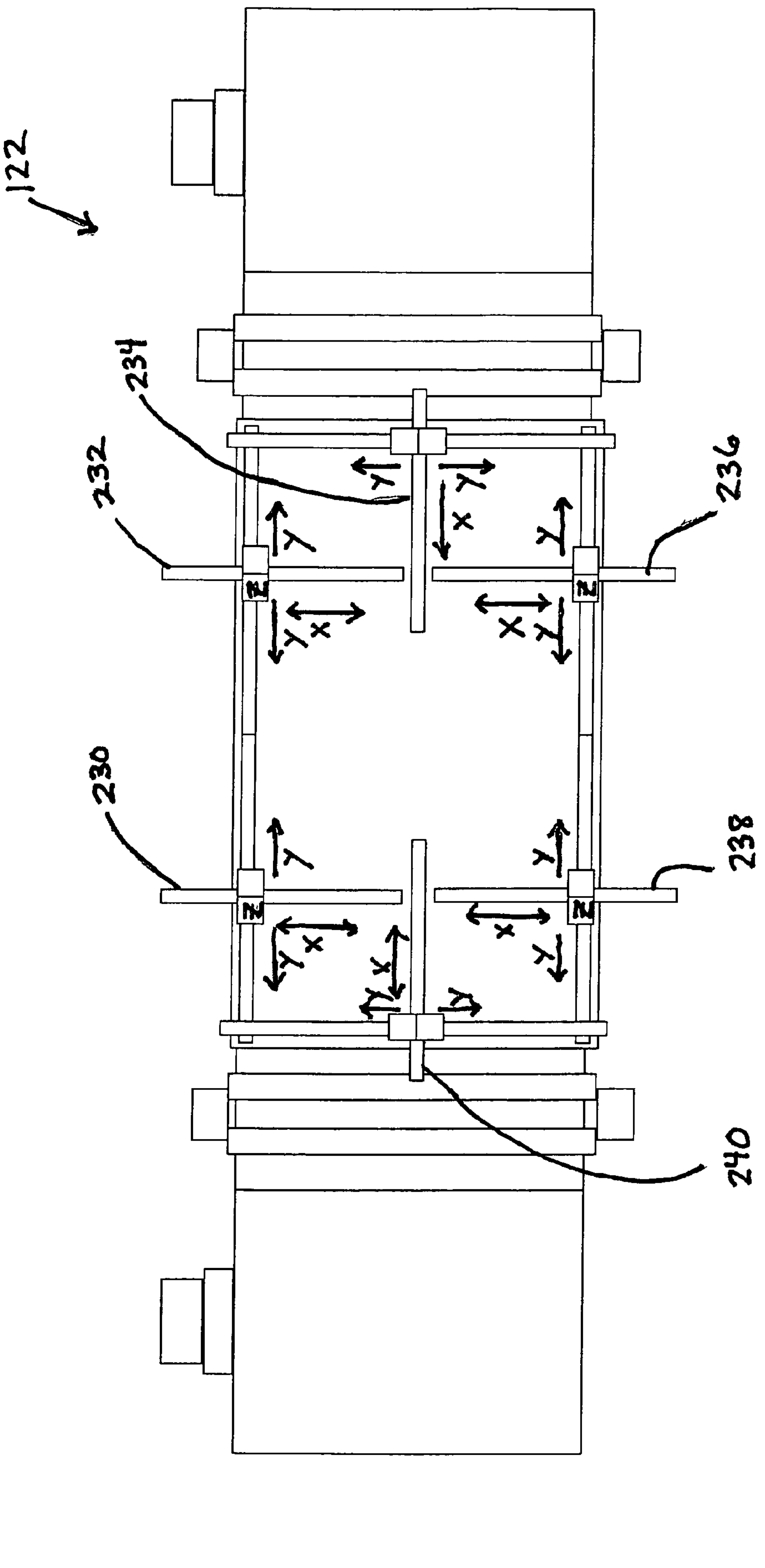
FIG. 15 shows a screen assembly apparatus according to an exemplary embodiment.

Referring to FIG. 15, screen apparatus 122 includes six 3-axis systems 230, 232, 234, 236, 238, 240 that control the positioning of dispensing heads in screen frames. These six systems 230, 232, 234, 236, 238, 240 have an x-axis, a y-axis and a z-axis. The z-axis is used to move the dispensing and curing head vertically up and down with respect to the screen frame. As shown in FIG. 15, the x-axis motors are used to position the dual head “Y” axis over the screen frame. The z-axis then lower the dispensing heads into the screen frame. Preferably, all systems are identical and all six have a 12-inch stroke. Upon the completion of load step 107 and screen advance step 107, the linear motors are preferably positioned for engaging the screening material into the screen frame. Computer system 130 sends parametric information to the drive controllers for the y- and x-axes and the z-axis for retraction from the previous screen completion sequence.

Commands from a computer system 130 (shown in FIG. 17) position systems 230, 232, 234, 236, 238, 240 at appropriate locations along different sized frames. In general, the y-axes represent areas of a screening machine that will engage a frame along its length, top and bottom. These axes bring dispensing heads closer to the frame rails. Once the y-axes engage the edges of the frame rails, the z-axes lower to allow the dispensing heads to engage the screen material and frame slot and the x-axes become ready to traverse the frame slot to seat and attach the screen to the frame. The y-axes then traverses away from centerline to begin additional operations.

Figure 16:
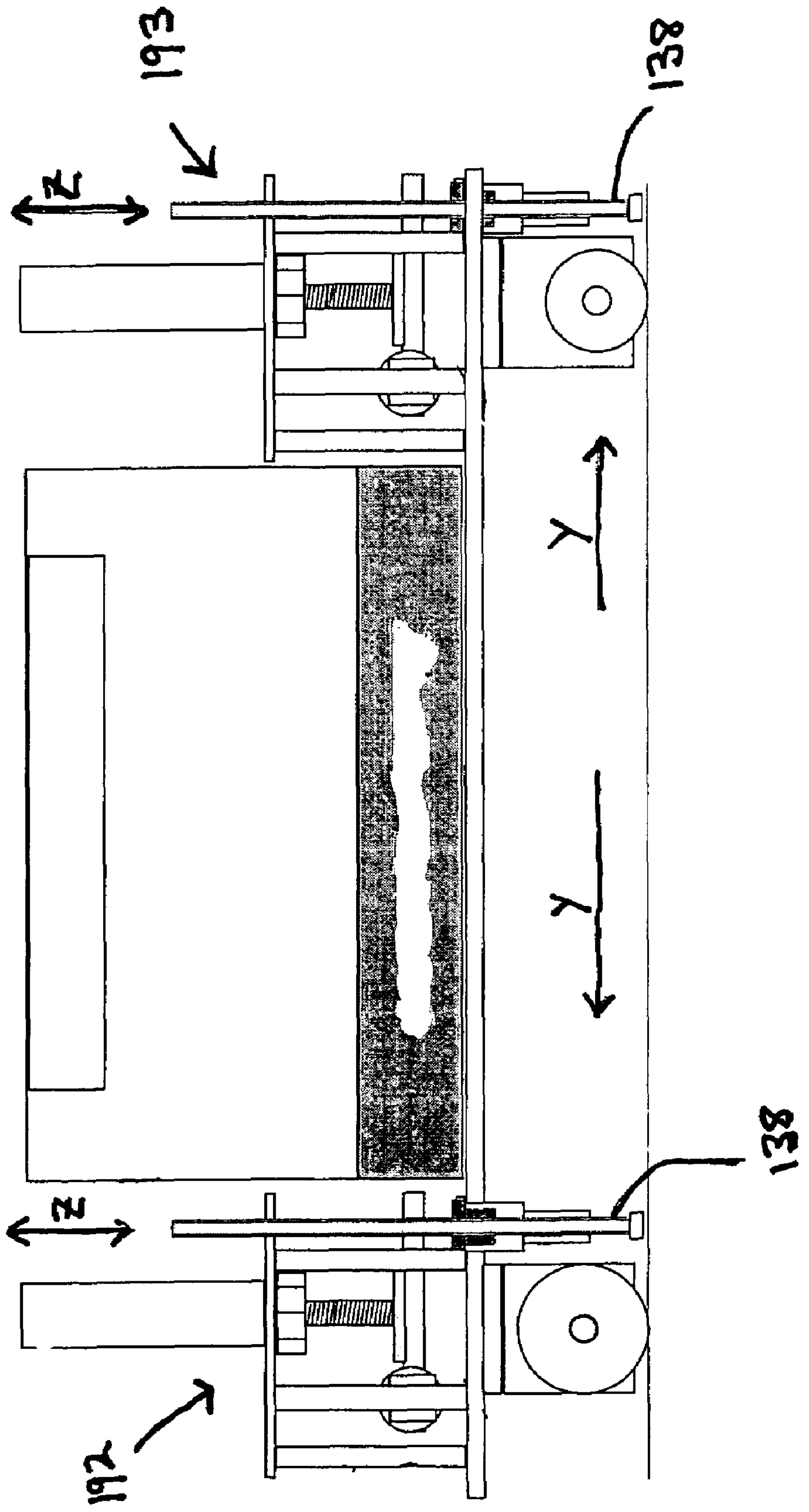
FIG. 16 shows a screen assembly apparatus with a dual head configuration according to an exemplary embodiment.
Figure 17:
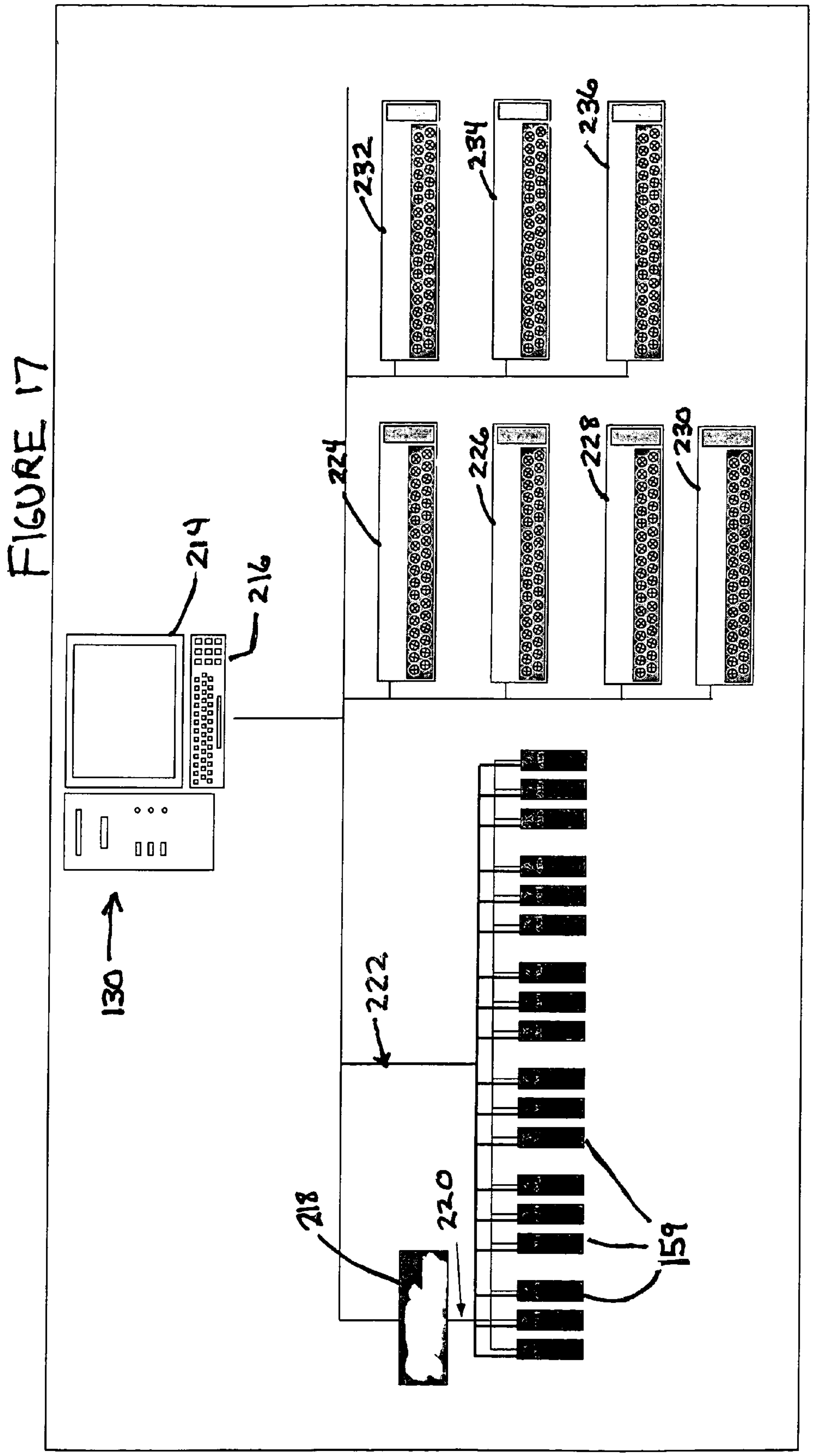
FIG. 17 shows a computer control system for a screen assembly apparatus according to an exemplary embodiment.

As shown in FIG. 16, dispensing heads 138 preferably have a dual head configuration for screen material mounting such that two separate dispensing head systems 192, 193 work in-line with one another. Head systems 192, 193 may start at a location determined by a computer (e.g. as shown in FIG. 17). As the screening process begins, the y-axes traverse away from the starting location to a computer controlled end location. The z-axes then retract and the y-axes return to the starting location. If the next screen is a different size, the x-axes advance or retract as appropriate. Alternatively, any number of configurations and sequences for the systems are possible. For example, two separate dispensing head systems may move toward one another, away from one another, parallel to one another, before or after one another, etc. Further, the disclosed system is not limited to just dual head designs. The dispensing heads may include any number of configurations (e.g., single heads, triple heads, etc.).

Figure 11:
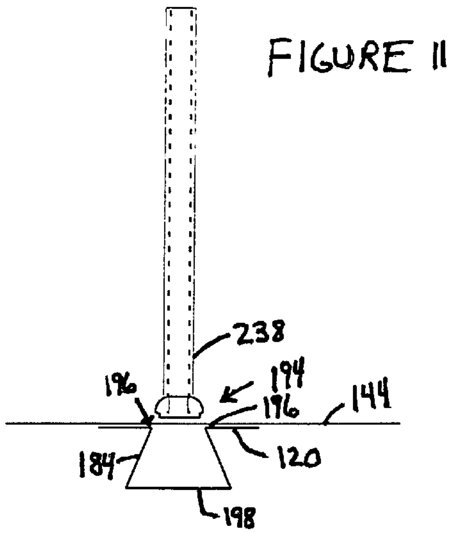
FIGS. 11–14 show a process of seating a screen material within a slot provided on a screen frame according to an exemplary embodiment.
Figure 12:
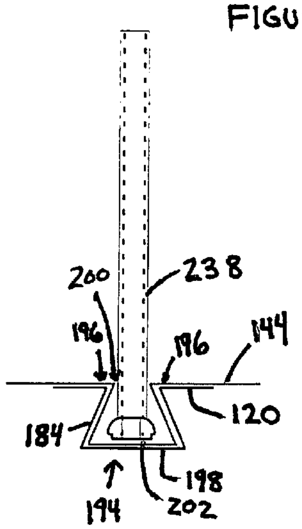
Figure 13:
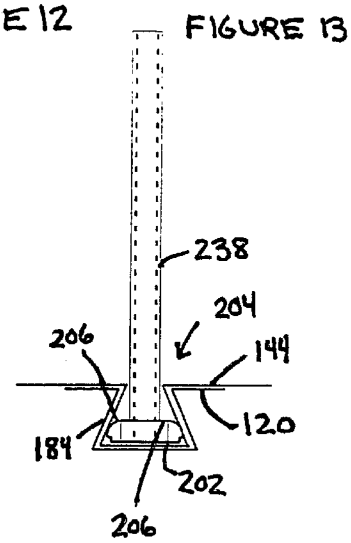

Once systems 230, 232, 234, 236, 238, 240 are positioned by a computer (e.g., computer 130 shown in FIG. 17), the dispensing heads seat the screen material in the screen frame. First, as shown in FIG. 8, seating wheel 120 pushes screening material 144 down into slot 184. Next, the seating tools 238 are moved into position, including an initial position of a first configuration 194. FIG. 11 shows seating tool 238 (e.g., part of the dispensing head) positioned over slot 184 in a first configuration 194. First configuration 194 allows tool 238 to slip downward between the sides 196 of slot 184 since slot 184 has a generally tapered shape inward from base 198 to opening 200 (as shown in FIG. 12). Once the head 202 of seating tool 238 is located in slot 184, head 202 is rotated approximately 25–150 degrees in a clockwise or counterclockwise direction so that tool 238 is aligned in a second configuration 204. Second configuration 204 allows tool 238 to substantially fill slot 184 in a longitudinal direction thereby allowing tool 238 to push screen material 144 against the sides of slot 184. FIG. 13 shows seating tool 238 in second configuration 204. Portions 206 of tool 238 extend under tapered sides 196 of slot 184, thereby preventing tool 238 from being removed from slot 184 during step 107. Base 199 of tool 238 also pushes against screen material 144 to further position the screen material 144 within slot 184.

Figure 14:
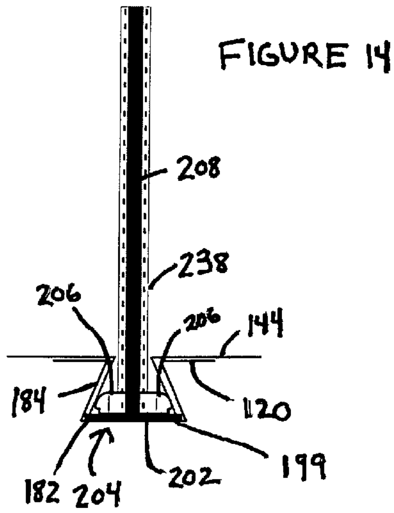

FIG. 14 shows how curable compound 182 is applied by dispensing tube 208. Compound 182 is extruded through tube 208 so that it exits out of tool 238 and onto screen material 144 after wheel 180 and seating tool 238 push screen material 144 into position in slot 184. The pressure of tool 238 on the extruded compound 182 positioned on screen material 144 and screen frame 120 helps apportion a suitable amount of compound 182 on screen material 144 so that proper curing may occur. According to a preferred embodiment, compound 182 is approximately 0.0275 inches thick after application. Compound 182 flows into slot 184 and takes the shape of the lower section of slot 184.

Once curable compound 182 has been applied to screen material 144 in slot 184, an ultraviolet light source 210 (as shown in FIGS. 8–10) is used to cure compound 182 by providing ultraviolet light to compound 182. Ultraviolet light source 210 is coupled to the screen assembly apparatus so that ultraviolet light is impinged into slot 184 as screen material 144 is positioned in slot 184 and compound 182 is extruded. A reflective system directs the ultraviolet light into slot 184 for curing compound 182 so that it will retain the shape of the lower section of slot 184. This prevents the newly formed screen compound combination from coming out of slot 184. Ultraviolet cure light source 210 preferably is of sufficient intensity that its close proximity to compound 182 will cause curing immediately. According to an exemplary embodiment, ultraviolet light with an input power in the range of about 200–800 watts over about a 1–7 inch length may provide sufficient curing of the compound. According to a preferred embodiment, ultraviolet light with an input power of about 500 watts over about a four inch length provides sufficient curing of the compound.

According to an exemplary embodiment, the compound may be cured with an ultraviolet light having a wavelength in the range of about 300 to about 450 nanometers. Further, the compound may be cured for a time in the range of about 1 to 3 seconds. Preferably, the compound is cured with an ultraviolet light having a wavelength of about 365 nanometers for about two seconds. Prior to curing, the compound may be applied (e.g., as a film, as a bead, etc.) to provide a layer having a thickness of about 0.015 to about 0.0425 inches. In addition, the compound may be applied so that the screen material is encapsulated such that the compound lies at or above a top surface of the screen material at the base of the tapered slot. Further, the compound may be applied so that an outer surface of the screen material located along a side of the tapered slot lies beneath an outer surface of the compound located along the sides of the slot.

Following the curing process, a trimming device 186 (e.g., an indexed multiple head knife blade) engages screen material 144 and trims excess material 144 against the outer edge 212 of slot 184 (from the inside of the slot as shown in FIGS. 8–10). Excess screen material 144 may then be "hidden" by the undercut of slot 184. Trimming device 186 is preferably configured to follow ultraviolet light source 210.

Once the screen material has been attached to a screen frame, the completed screen is preferably ejected from the screen assembly apparatus for stacking and shipping. According to an exemplary embodiment, the ejection system may comprise belted tangs that push the completed screen off of the platen for an operator to take and package it. This system can work in coordination with an inlet vacuum and locating system. In addition, the rollers and stops used to locate and affix the frame for secondary screening operations may continue to roll the screen out for ejection. These rollers may be made of materials that will be hard enough for good wear characteristics and pliable enough for effective location of the frame.

According to exemplary embodiments, the completion of the frame may require a release of pre-stressing tangs and/or a retraction of locating backstop tangs so that the frame can be ejected for bundling. Further, vacuum system valves can cycle to apply pressure to the frame thereby allowing easier ejection. This way, the vacuum system can remain at a pressure to allow for positioning of a screen frame when the screening process is restarted. In addition, ejection rollers may assist in the ejection process by activating and driving the completed frame out of the system.

In general, the screen assembly apparatus may comprise a PC based hierarchical control system including a central main computer with software for machine control. As FIG. 17 shows, a computer system 130 including a display system 214 and input device 216 may be used to control the screen assembly. According to the illustrated embodiment, a drive motion computer 218 controls each linear motor 159 which are connected to a high speed digital communication network 220. Computer system 218 may be connected with each linear motor 159 over a low speed digital communication network 222. A plurality of input/output (I/O) panels 224, 226, 228, 230, 232, 234, 236 allow a user to also monitor and control functions of various sensors and systems (e.g., vacuum system, linear motors, ultraviolet compound dispense valves, etc.) within the screen assembly apparatus.

It is important to note that the above-described preferred embodiments are illustrative only. Although the invention has been described in conjunction with specific embodiments thereof, those skilled in the art will appreciate that numerous modifications are possible without materially departing from the novel teachings and advantages of the subject matter described herein. For example, although the invention is illustrated using particular apparatus for screening a screen frame, any number of variations to the apparatus may be used. Accordingly, these and all other such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present invention.

What is claimed is:

1. A method for manufacturing a screen assembly, comprising:

constructing a screen bar frame having a tapered slot extending at least substantially along a front side of the screen bar frame;

spreading a screen formed of open mesh ventilation material over the screen bar frame so that a portion of the screen is disposed within the tapered slot;

applying a predetermined quantity of curable compound onto the portion of the screen disposed within the tapered slot; and curing the curable compound to mechanically interlock the screen to the screen frame at a predetermined tension;

wherein the applying step and the curing step occur at substantially the same time.

2. The method of claim 1, wherein the screen is tensioned while the compound is being cured.

3. The method of claim 1, further comprising trimming extra screen material after the screen is disposed within the tapered slot.

4. The method of claim 3, wherein the trimming step, applying step, and curing step occur at substantially the same time.

5. The method of claim 1, wherein the compound comprises an ultraviolet curable compound.

6. The method of claim 5, wherein the ultraviolet curable compound is cured with ultraviolet light having a wavelength in the range of about 300 to about 450 nanometers.

7. The method of claim 5, wherein the ultraviolet curable compound is cured for a time in the range of about 1.0 to about 3.0 seconds.

8. The method of claim 1, further comprising encapsulating the screen with the compound so that a top surface of the screen positioned at the base of the tapered slot lies at or beneath a top surface of the compound at the base of the tapered slot.

9. The method of claim 1, further comprising encapsulating the screen with the compound so that an outer surface of the screen located along a side of the tapered slot lies beneath an outer surface of the compound located along the side of the tapered slot.

10. The method of claim 1, wherein the screen comprises a fabric.

11. The method of claim 4, wherein the screen bar frame comprises a length and a width, and wherein the trimming step, applying step, and curing step commence proximate a center of the screen bar frame length and progress toward opposite corners of the screen bar frame length.

12. The method of claim 11, wherein the trimming step, applying step, and curing step commence proximate a center of the screen bar frame width and progress toward opposite corners of the screen bar frame width.

13. The method of claim 12, wherein tension of the screen is substantially symmetrical along the screen bar frame width and the screen bar frame length and resultant forces on the frame are substantially symmetrical.

14. The method of claim 4, wherein the trimming step, applying step, and curing step are automated.

* * * * *